Feb. 12, 1952 — C. F. WALLACE — 2,585,060
ELECTRICAL CELL APPARATUS FOR TESTING LIQUIDS
Filed March 5, 1948 — 2 SHEETS—SHEET 2
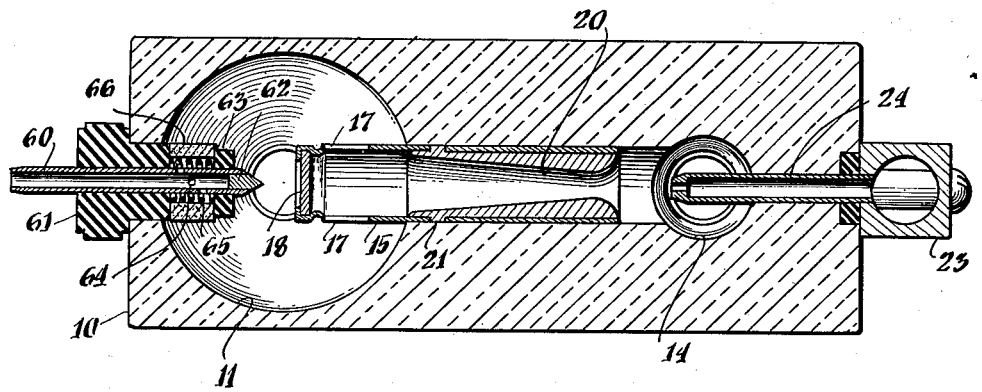
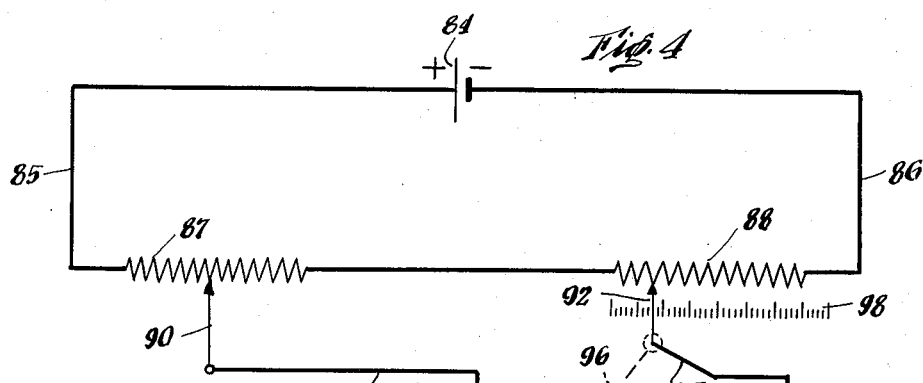
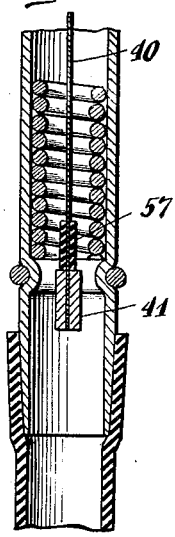
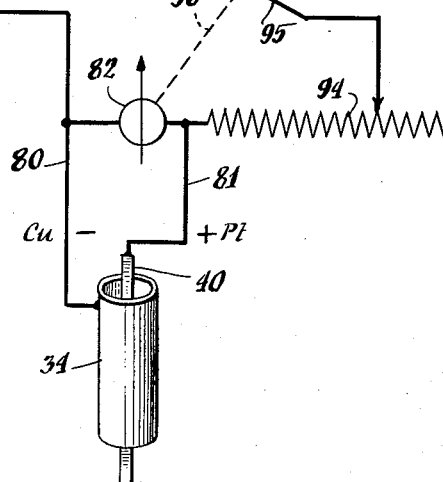
INVENTOR.
Charles F. Wallace
BY Robert S. Dunham
ATTORNEY Patented Feb. 12, 1952

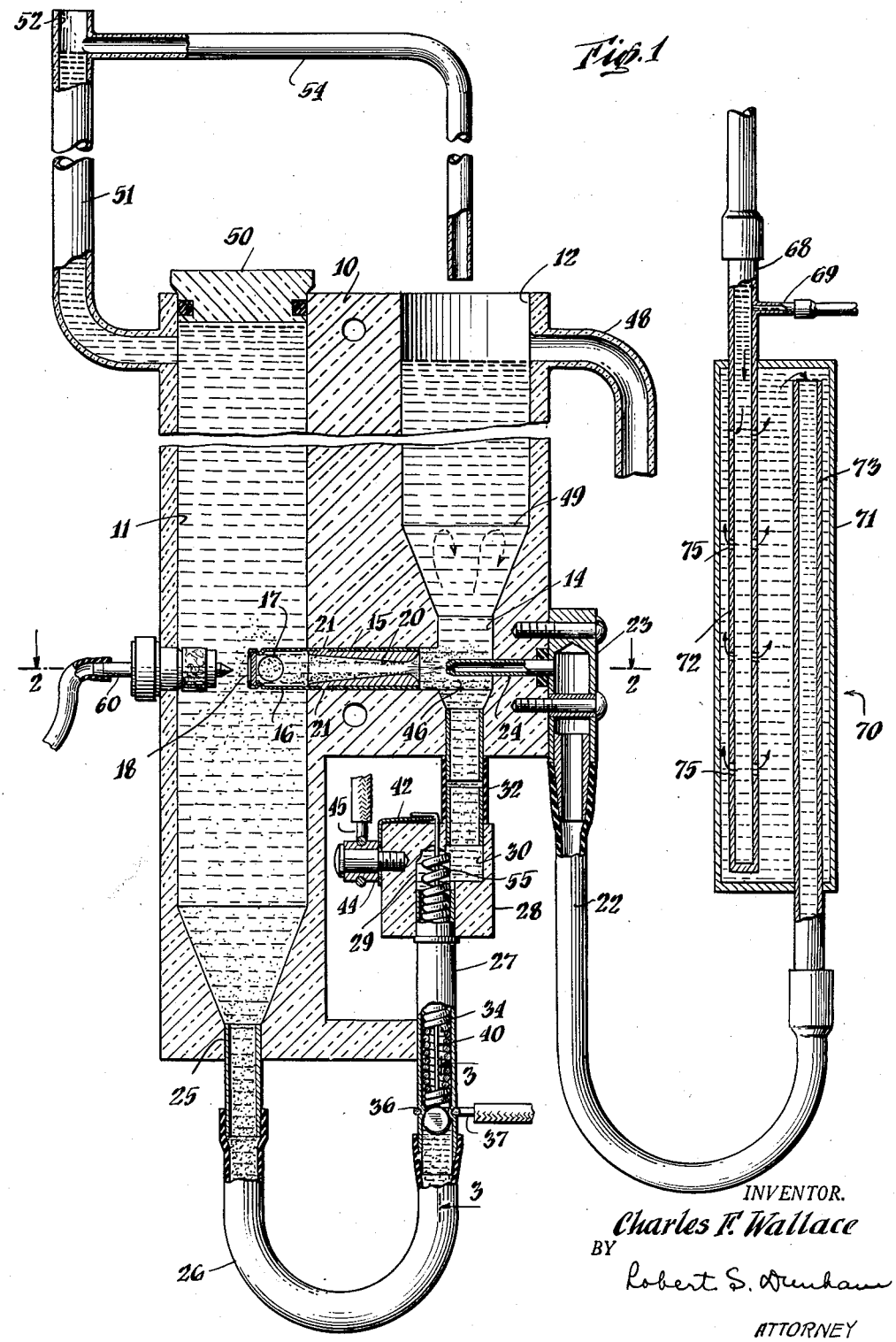

2,585,060

UNITED STATES PATENT OFFICE 2,585,060

ELECTRICAL CELL APPARATUS FOR TESTING LIQUIDS

Charles F. Wallace, Westfield, N. J., assignor to Wallace & Tiernan Products, Inc., Belleville, N. J., a corporation of New Jersey Application March 5, 1948, Serial No. 13,277

10 Claims. (Cl. 204—195)

This invention relates to electrical cell apparatus for detecting chemical characteristics of liquids, and more specifically to cells adapted for electrochemically detecting minute quantities of materials such as oxidizing or reducing substances, for example in a continuously flowing sample or other stream of liquid. A notably important field of such test for which various types of systems have been proposed is in the direct or indirect determination of active chlorine, particularly residual chlorine such as may be present in water, sewage or other aqueous liquid that has been subjected to chlorine treatment, e. g. for purification. Thus in testing and controlling such treatments, for municipal water supplies, sewage disposal plants and the like, it is generally recognized that the residual chlorine concentration of the treated liquid, correlated with the elapsed time between treatment and test, is a measure of the effectiveness of chlorination.

It will be understood that the present type of cell for detecting minute quantities of oxidizing agent or the like may be employed in a variety of ways, for example in that the electrical response may be translated to provide a direct indication or record of the amount of residual chlorine or of change in residual chlorine content; or the cell may be used for any of a variety of control purposes, e. g. for control of treating means to maintain a predetermined chemical condition of the liquid. In all cases the apparatus must exhibit a high sensitivity, for instance, chlorine concentrations to be detected are usually of the order of a few parts per million or less, making it often desirable to detect amounts at least as little 0.1 p. p. m. and changes as small as 0.01 p. p. m., and at the same time the cell must be comparatively rugged and adapted to maintain its characteristics throughout relatively long intervals.

In the latter respect, the cell should be unaffected by, or free from, deteriorating influences, such as slime or other deposits left by the passing stream of water, sewage or the like over a period of time, and also such gaseous or other effects as may be electrically produced on an electrode surface, to the detriment of the intended response. It is also desirable that the cell have a relatively considerable electrode surface and be otherwise circumstanced so that the electrical path through the liquid under test may have as low an electrical resistance as possible and especially so that changes in the resistance or conductivity of the liquid will therefore have a minimum effect. It will be understood that cells such as contemplated herein are preferably operated in such a way as to detect for example, an oxidizing substance by yielding a current flow or an E. M. F. which is directly governed by the extent of oxidation reaction (at one electrode), under circumstances where the extent of such reaction corresponds to the concentration of the oxidant; in these and other respects, the criteria of a successful cell may be quite different from apparatus or situations wherein relatively large quantities of dissolved electrolytes are determined by simple measurement of electrical conductivity.

Accordingly a chief object of the present invention is to provide improved cell apparatus of the character stated, satisfying the requirements described above, affording an accurate and reliable response, and particularly suited for use with flowing streams of aqueous liquid of which a continuous test must be made. Another object is to provide rugged and yet highly sensitive cell structure embodying novel arrangements for maintaining a clean and fully responsive condition at the exposed electrode surface, and especially to provide cell structure having such provisions and adapted for continuously receiving, testing and discharging a flow of liquid.

Further objects are to provide novel and improved cells and electrode structure therefor and means for handling liquid therein, adapted to yield highly accurate results in detecting changes in concentration of oxidizing or reducing substances over a long period of time; and to provide an efficient electrode-cleaning arrangement in such cells susceptible of automatically maintaining the desired sensitivity of electrode surface and yet avoiding undue wear on the latter or other cell parts.

To these and other ends such as will be hereinafter apparent or are incidental to the use of the disclosed improvements, a presently preferred embodiment of the latter is described below and shown in the accompanying drawings by way of illustrative example of the nature and principles of the invention.

Referring to the drawings:

Fig. 1 is a view, chiefly in vertical section, of the cell apparatus, including means for continuous supply and withdrawal of liquid under test;

Fig. 2 is a horizontal section on line 2—2 of Fig. 1;

Fig. 3 is an enlarged, fragmentary vertical section on line 3—3 of Fig. 1; and

Fig. 4 is an electrical wiring diagram showing one form of electrical circuit which may be used for response to the cell.

Referring to Figs. 1 to 3 inclusive, the illustrated apparatus includes a body structure 10 providing a vertical cylindrical chamber 11 at one side and another vertical cylindrical chamber 12 at the upper part of the other side. The body 10 and likewise other structural elements of the cell may be conveniently made of electrically non-conductive material such as Lucite (a polymerized derivative of methacrylic acid), which is chemically inert to the liquid under test, examples of other suitable materials being glass, phenol formaldehyde resins and the like. The lower end of the chamber 12 tapers to a cavity 14 of reduced diameter, from which a lateral conduit generally designated 15 extends to the chamber 11. The conduit 15 comprises a tube 16 of silver or the like which has a pair of side openings 17 adjacent its closed end 18 that projects into the chamber 11, for communication with the latter through the said openings. The conduit also includes a throat portion 20, conveniently made of rubber or synthetic elastic or other plastic material, and shaped to constitute a Venturi device whereby liquid entering the cavity 14 is accelerated and projected as a jet into the chamber 11. The Venturi element is anchored by its projections 21 fitted in holes in the tube 16. One useful material for parts such as the element 20 stated to be made of an elastic substance, is Tygon, a synthetic thermoplastic resin containing vinyl linkages.

Water or other liquid to be tested by the cell is supplied through an inlet conduit 22 having a suitable fitting 23 communicating with a jet tube 24 that has a small opening (e. g. 0.032 in. diameter) at its end and that projects into cavity 14. Together the jet and venturi form a simple injection pump.

The lower end of the chamber 11 tapers to an outlet port 25, from which a conduit 26 extends to the lower end of a copper tube or sleeve 27 constituting a part of the electrical cell per se. The upper end of the tube 27 is fitted into a supporting block 28 of Lucite or the like, there opening into a cavity 29 which communicates with an adjacent recess 30 disposed beneath the portion of block 10 that contains the chamber 12 and cavity 14. The recess 30 is directly connected with the bottom of the cavity 14 by a vertical conduit 32, and thus a complete recirculating path for liquid is afforded from the cavity 14 through the venturi 20, the chamber 11, the conduit 26, the tube 27 and the connecting structure 30—32, back to the cavity.

The cell tube 27 is lined, subsltantially throughout, with a helical coil of copper wire 34, which rests at its lower end on a shoulder formed by an inwardly pressed circumferential groove 36 in the tube. The groove 36 may also externally serve to receive a suitable wire 37, for instance arranged as a spring clip to snap around into the groove, for electrical connection to the sleeve 27 and the copper helix within. Whereas a tubular element of cylindrical or other simple shape may alone suffice in some instances as one electrode of the cell, the illustrated arrangement of the copper coil provides a desirably extended surface area.

The other cell electrode comprises a thin, narrow platinum ribbon 40 (for instance $\frac{1}{32}$ in. wide, 0.002 in. thick) anchored at its lower end between a pair of non-conducting, plastic disks 41 which are retained beneath the inner bead constituted by groove 36. The upper end of the platinum ribbon traverses a closely fitting opening in the block 28 and is secured to an upwardly biased spring element 42 which thus keeps the ribbon taut, in a central, parallel relation to the sleeve 27 and the helical electrode 34. The spring 42 is secured beneath an appropriate binding post 44, which also serves to provide external electrical connection to the platinum ribbon electrode, e. g. for attachment of a connecting wire 45. It will be understood that although platinum and copper have been found particularly suitable as electrode materials for the specific purposes here mentioned, other electrode arrangements and combinations may be employed when desirable, e. g. selected from such substances as platinum, copper, gold, silver, carbon, and the like, in accordance with known electro-chemical principles. The platinum-copper combination here used gives excellent results, including high sensitivity and low zero current.

In accordance with the presently preferred manner of operation, the chambers 11, 12, the cavity 14 and the associated connecting parts including the structure enclosed by the cell sleeve 27 are all filled with liquid, e. g. as originally derived from the liquid under test. In further accordance with the present invention, a quantity of abrasive material, e. g. a quantity of fine particles of grit 46 are disposed in the system, and for purposes of present explanation may be considered to originate, i. e. as a mass of such particles, in the cavity 14. While other abrasive or scouring substances such as fine sand and like heavy particles may be used, particularly satisfactory results have been obtained with fine aluminum oxide or Alundum, for instance No. 60 grade of the latter.

Assuming now that water or other aqueous liquid to be tested is continuously supplied through the conduit 22 and the jet tube 24, for instance at a rate of the order of one-third litre per minute, the path of flow is around the circuit described above, including the electrode helix 34, and upon return to the cavity 14, the excess liquid continuously rises in the chamber 12 and discharges through an overflow pipe 48 at the top of the latter. The pumping action of the jet 24 and the venturi 20 not only carries the incoming water into the chamber 11 and around the circuit but also causes entrainment of abrasive particles therein, so that the flow leaving the openings 16 continuously carries a substantial quantity of them in suspension. The particles accordingly travel with the water around the indicated path, being swept upwardly through the cell structure, i. e. within the helical electrode 34 and along the inner surface of the latter and simultaneously along the surface of the platinum ribbon electrode 40. The density of the suspension is somewhat greater in the cell itself, because of the small cross-section of the liquid path.

At the upper end of the tube 27 the liquid and grit mixture is delivered from the cavity 29 to the outlet recess 30, returning thence upward to the cavity 14. While the pressure of the liquid (and its continuous displacement by incoming liquid) causes it to continue flowing upward around the jet tube 24 and through the chamber 12 to the overflow pipe 28, the grit particles effectively fall back, i. e. into the cavity 14 for re-entrainment by further liquid entering through the jet tube. That is to say, although there may be some tendency of the abrasive particles to rise in the chamber 12 the upward velocity of the water decreases markedly as the chamber widens out, e. g. to the region 49, so that the propellent force on the particles is not sufficient to overcome their weight and they fall back, by gravity, to the cavity 14. Thus few, if any, particles are lost, and for even a long period of operation it is only necessary to introduce initially enough grit so that the desired suspension is maintained continuously throughout the circuit and particularly within the cell tube 27.

To facilitate or insure the desired flow of liquid around the recirculating path and in a smooth uniform manner, the apparatus preferably includes means affording a considerable static head, of constant value, on the liquid in chamber 11. Thus, for example, the upper end of the chamber is closed by a plug 50, but communicates with a vertical static tube 51 of considerable height (adjustable, if desired), e. g. so as to provide a static head of 12 to 14 inches or so above the level of liquid in the outlet chamber 12. The tube 51 is open at its upper end 52, and also has an overflow or return tube 54 which is adapted to discharge excess liquid into the open upper end of the chamber 12, and which thus actually determines the static head, or the maximum value of such head, in the chamber 11. In fact, there may even be a continuous overflow through the tube 54, to the extent that the incoming water, as delivered to the chamber 11 by the jet tube 24 and the venturi 20, tends to build up a pressure in the chamber greater than such maximum value.

It will now be seen that the sample flow of liquid under test continuously traverses the entire length of the exposed, elongated electrodes, for effective electrical response, while entrained abrasive particles are carried through the same path so that the electrode surfaces are constantly wiped or scoured all the way along, and are kept clean and free of objectionable deposits and the like. The lengthwise or sweeping motion of the particles is fully effective for this purpose, and yet avoids severe wear or deep abrasion of the metal surfaces.

Although nearly all the turns of the copper helix 34 in the cell are closed as shown, the few uppermost turns 55 are opened out; this arrangement, apparently by providing minor eddy currents in the water, prevents undue wear by the grit particles on the interior of the block cavity 29 and on the upper end of the platinum ribbon 40. For like avoidance of undue abrasion, the lower end of the ribbon 40, i. e. for a short distance above the retaining disks 41 as shown in Fig. 3, is encased in a sleeve 57 of insulating material.

While the illustrated apparatus may in some cases be employed for electrical response directly to the chemical characteristic of the liquid under test, experience has indicated that a more satisfactory determination, in the case of residual chlorine in water, can be achieved by using a supplemental reagent. Thus if an iodide, such as potassium (or sodium) iodide, is incorporated in the sample stream, it reacts with the available chlorine to release a corresponding quantity of available iodine, e. g. free iodine, which is thereupon detected by the cell. The resulting determination corresponds to the total concentration of available chlorine in the water, i. e. including both chloramines and the hypochlorous or so-called free form of chlorine. Whereas the direct response of this type of cell to free chlorine is usually quite effective, the direct sensitivity to chloramines is relatively small, making it difficult to obtain accurate readings of total residual when both forms are present. However, iodide reacts equally promptly and indeed quantitatively, with both types of chlorine, in each case yielding available iodine to which the cell is fully sensitive.

Thus the apparatus may have means for continuously injecting a solution of potassium iodide (containing, say, 15 g. per liter), which can also include a suitable buffer. For instance an acetate buffer may be used, comprising sodium acetate and acetic acid, to keep the water under test at a pH of about 5, which seems most satisfactory for the described type of operation.

The solution feeding device (Figs. 1 and 2) comprises a silver injector tube 60, which is connected to a supply of the solution (not shown) under pressure, and which traverses an elastic bushing 61 in the wall of the chamber 11. The tube 60 is closed at the end by a plug 62 and carries a rubber washer or the like 63 spaced from the inner face of the bushing. The tube 60 also has a plurality of small apertures 64 between the bushing and the washer, surrounded by an open helix or coil 65 of silver wire which is in turn enveloped by a felt sleeve 66. Thus the solution of iodide and buffer escapes through the holes 64 and diffuses into the water through the sleeve 66, the coil 65 preventing the felt from jamming the holes 64. Where the reagent solution is advanced to the tube 60 by a reciprocating pump (not shown) the felt sleeve, by providing a gentle resistance, also serves to smooth out the pump pulsations and provide uniform flow of the solution.

The parts just described are preferably aligned on the same horizontal axis as the tube 15, an arrangement that facilitates initial construction and insertion of both assemblies, and also subsequent access, as for cleaning. The closure 18 at the end of the tube 15 then prevents any direct abrasive jet from striking the reagent injector.

It is sometimes desirable to determine separately the free chlorine content, or the chloramine content or both, of the liquid under test. To that end a solution of a suitable nitrite, e. g. sodium nitrite, may be fed into the sample water line, preferably well upstream of the locality at which it mixes with the iodide solution. The nitrite has the property of combining with the free chlorine but not with chloramines, so that the latter alone remain to react with the iodide solution. Accordingly, so long as nitrite is being fed, the apparatus will respond only to chloramines, and upon comparison with preceding or following periods of test for total chlorine (e. g. when the content of the water under test is otherwise just the same and when no nitrite is used) the free chlorine concentration may be determined by simple subtraction. To effectuate operations of this character, an upstream portion 68 of the sample water line has opening into it, a small injector tube 69 through which the nitrite solution can be fed for desired intervals.

In order to smooth out pulses from the nitrite pump (i. e. where a reciprocating pump, not shown, is provided to feed the nitrite solution), and to provide a short reaction time, the inlet line may desirably although not necessarily, include an equalization chamber 70 comprising an outer shell 71 into which two parallel pipes 72, 73 project from opposite directions, the pipe 72 communicating with the inlet pipe 68 and the pipe 73 being connected to the further inlet pipe 22. The pipe 72 is closed at its further end and has a multiplicity of small openings 75 spaced along it, while the pipe 73 is simply open at its outer end, i. e. remote from the end of the pipe 72. Thus the water flows into the pipe 72, out through various of the holes 75, and then through the body of water in the vessel 71, to the open end of the pipe 73. The tortuous and divided paths thus followed by the stream afford sufficient resistance or impedance to provide the above mentioned smoothing and like functions.

Although any of a variety of circuits may be employed to detect and translate (for indicating, recording or control purposes) the electrical effects exhibited across the cell electrodes, one particularly suitable arrangement is shown for example in Fig. 4. Here the central platinum electrode 40, of positive polarity in the described detection of chlorine or iodine, and the correspondingly negative outer electrode 34, are connected by conductors 80, 81 to a galvanometer 82. The terminals of the latter are also connected to adjustable means which can establish a current flow, through the galvanometer, equal and opposite to that furnished by the cell, the extent of adjustment of such means (necessary for zero galvanometer indication) then providing the desired reading of the electrical response. For instance, an appropriate cell or source of constant voltage 84 is connected by conductors 85, 86 to resistances 87 and 88 in series, the resistance 87 having an adjustable tap or contact 90 and the resistance 88, of the nature of a slide wire, having an adjustable contact or arm 92. The tap 90 on the resistance 87 is connected by conductor 93 to one terminal of the galvanometer, and the other terminal of the latter is connected through a variable resistance 94 and conductor 95 to the contact arm 92 of the slide wire resistance 88. Thus depending on the adjustment of the arms 90 and 92, a varying E. M. F. of opposite polarity to the cell can be applied across the galvanometer, i. e. through the variable resistance 94.

In operation, the slide wire 92 is kept adjusted to a position where the galvanometer reads zero, i. e. where the currents through it from the cell and the balancing circuit are exactly opposed. Upon any change of residual chlorine concentration in the water under test, the cell current tends to change and the galvanometer needle departs from zero. The slide wire arm 92 may then be readjusted, either manually or by suitable mechanical or electrical follow-up means indicated by the dotted line 96, to a new position of balance where the galvanometer is restored to zero. In consequence a scale 98 for the arm 92 may be calibrated in amounts of residual chlorine, or other values sought to be indicated.

Preliminarily and otherwise as necessary from time to time, adjustment of the zero point of the ultimate reading may be effected by moving the contact 90 on the resistance 87, e. g. so that if there is no chlorine in the water, the circuits are balanced when the arm 92 is at a desired zero position of the scale 98. The variable resistor 94 provides adjustment in range of the apparatus, for instance to fit the cell response characteristic to the selected scale 98, and preferably has a high value such as 5,000 to 25,000 ohms. The components of the balancing circuit are also preferably selected, as will now be understood, so that the voltage variation available across the slide wire is substantially greater than the voltage variation exhibited by the cell throughout the normal range of chemical characteristics which it is used to detect. The illustrated circuit is of particular advantage in that the galvanometer, operating at the vicinity of its zero point functions with maximum sensitivity, and at the same time the actual determination of chemical content is not dependent upon any reading of the extent of deflection of a galvanometer or similar instrument.

It will be understood, nevertheless, that the cell may be advantageously connected and used in other ways, for example where a straight electrode potential method is to be employed for measurement of chemical characteristics or changes in a liquid. In such case the electrical circuit may be of any known, potential-responsive type suitable for detecting electrode potentials or changes thereof in the voltage range corresponding to the selected circumstances of the cell and the specific electro-chemical test to be made.

The described cell has been found to be very effective and accurate in detecting changes of residual chlorine or the like, i. e. (as set forth in the stated objects) small changes of a substance present in only an extremely minute concentration. The arrangement is amply rugged and keeps its sensitivity and reliability over long periods of time, especially by reason of the means for maintaining optimum surface conditions at the electrodes.

It is to be understood that the invention is not limited to the specific structures herein shown and described, but may be embodied in other forms without departure from its spirit as defined by the following claims.

I claim:

1. In electrical cell apparatus for detecting a chemical characteristic of a liquid, in combination, a tubular electrode of long, narrow, cylindrical configuration, open at both ends, a second long electrode substantially coextensive with the first and disposed coaxially within said tubular electrode, a conduit structure having its ends respectively connected to the ends of the tubular electrode and thereby providing a circulating liquid system extending through said tubular electrode, said conduit structure including a chamber adapted to receive abrasive particles, liquid injecting means opening into the chamber for continuously introducing liquid into the conduit structure, to flow around the structure and to entrain the particles of abrasive and to carry the same in suspension through the tubular electrode for scouring the electrode surfaces, and passage means opening into said conduit structure for continuously discharging liquid therefrom, said tubular and second electrodes being shaped for traversal of said abrasive particles substantially only in an axial direction of the tubular electrode so that the particles engage the inner surface of the tubular electrode and the surface of the second electrode only in a sweeping relation thereto.

2. Apparatus as described in claim 1, wherein the second electrode consists of a long ribbon of noble metal disposed linearly along the axis of said tubular electrode.

3. In electrical cell apparatus for detecting a chemical characteristic of a liquid, in combination, an elongated tubular structure open at both ends and having an electrode surface extending lengthwise inside thereof, conduit structure extending from one end of the tubular structure to the other, to provide a liquid circulating system for travel of liquid through the tubular structure, jet means opening into the conduit structure for continuously introducing liquid, said conduit structure containing abrasive particles to be entrained by the liquid and carried thereby through the tubular electrode structure in sweeping, abrasive contact with the said electrode surface, and passage means opening into the conduit structure for discharge of liquid therefrom.

4. In electrical cell apparatus for detecting a chemical characteristic of a liquid, in combination, a tubular structure providing a passage for liquid and open at both ends, said structure including an internal electrode surface facing the interior of the tubular structure and extending throughout the length of same, conduit structure joining the ends of said tubular structure to provide a system for circulating liquid through the tubular structure, liquid injecting means opening into the conduit structure for continuously introducing liquid into the circulating system, to circulate said liquid around through the tubular structure, said conduit structure containing abrasive particles to be entrained by the introduced liquid and carried through the tubular structure in sweeping, abrasive contact with said electrode surface, and an upright chamber opening at its lower end into said conduit structure and adapted to discharge liquid at its upper end, for withdrawal of liquid from the system while permitting the abrasive particles to fall back by gravity into the conduit structure.

5. In electrical cell apparatus for detecting a chemical characteristic of a liquid, in combination, a tubular structure open at both ends and including an internal electrode surface facing the interior of said tubular structure and extending throughout the length thereof, conduit structure joining the ends of the tubular structure to provide a liquid circulating system therewith, means for continuously injecting liquid into said conduit structure, said conduit structure containing abrasive particles to be entrained by the injected liquid and therewith circulated through the tubular structure in sweeping, abrasive contact with the electrode surface, an upright vessel opening into the conduit structure at its lower end and having an outlet at the top, for continuous overflow of liquid from the conduit structure, said vessel having a horizontal diameter substantially greater than that of the conduit structure at the locality of the latter where the vessel opens into it.

6. In an electrical cell apparatus for detecting a chemical characteristic of a liquid, in combination, a tubular structure of long, narrow, cylindrical configuration, open at both ends and including an internal, inwardly facing electrode surface extending lengthwise of the tubular structure, a second long electrode substantially coextensive with the tubular structure and disposed axially therein, spaced from the electrode surface, conduit structure joining the ends of the tubular structure to provide therewith a liquid circulating system, liquid injecting means opening into the conduit structure for continuously introducing liquid, said conduit structure containing abrasive particles to be carried by the liquid through the tubular structure in sweeping, abrasive contact with the electrode surface and with the second long electrode, said liquid injecting means being adapted to direct liquid for flow in a predetermined direction through the circulating system including the tubular structure, an upright chamber opening at its lower end into the conduit structure at a locality of the latter near the end of the tubular electrode structure from which liquid departs, said chamber providing liquid outlet at its upper end and having a horizontal cross-section substantially greater than that of the tubular electrode structure, so that the velocity of the liquid discharging through the chamber is reduced from its velocity in the tubular structure, to inhibit rise of the abrasive particles to said outlet.

7. In electrical cell apparatus of the character described, in combination, a vertical elongated tubular electrode structure open at both ends and having an internal electrode surface extending lengthwise thereof, conduit structure joining the ends of the tubular structure to provide therewith a liquid circulating system, said conduit structure comprising a chamber disposed above the upper end of the tubular structure and another chamber which is spaced along the conduit structure from the first chamber and which extends vertically downward, said conduit structure including a further conduit portion connecting the lower end of the second chamber with the lower end of the tubular structure, said conduit structure containing abrasive particles to be entrained in liquid therein, means for continuously injecting a jet of liquid to be tested, into the first chamber, in a direction for advance of said liquid to the second chamber and thereby for circulation through the conduit structure and the tubular structure, so that abrasive particles are entrained by the liquid and carried through the tubular structure in sweeping contact with the electrode surface thereof, and an upright discharge chamber opening at its lower end into the first chamber and being adapted to discharge liquid at the upper end of said discharge chamber, said discharge chamber having a substantially larger cross-section than the first chamber to inhibit rise of abrasive particles in the outflowing liquid.

8. The apparatus of claim 7 wherein the conduit structure comprises a venturi passage between the first and second chambers, to cooperate with the liquid injecting means for effecting circulation of liquid and entrainment of abrasive particles, along the conduit structure.

9. The apparatus of claim 7 wherein the second chamber includes an upright conduit opening at its lower end into said second chamber and extending vertically therefrom, to provide a predetermined static head on the liquid in the second chamber.

10. In electrical cell apparatus of the character described, in combination, a tube open at both ends, a long, thin helix open at both ends and comprising a multiplicity of turns of conducting wire coaxially disposed in said tube, said helix having its said turns closed substantially throughout its length, a thin elongated element of conducting material disposed within said helix linearly along the axis thereof, an inlet conduit connected to one end of the tube, an outlet conduit connected to the other end of the tube, said conduits providing means for continuously advancing liquid in a single direction through the helix from one end to the other, for exposure of the said element and the inside of the helix to the advancing liquid, conduit structure joining the outer ends of said inlet and outlet conduits to provide therewith a circulating system, means for introducing liquid into the system, and means for discharging liquid from the system, said circulating system containing abrasive particles to be entrained by the introduced liquid and carried by said liquid through the helix and in sweeping contact with the inner surface of same and with the surface of the element.

CHARLES F. WALLACE.

REFERENCES CITED

The following references are of record in the file of this patent:

UNITED STATES PATENTS

| Number | Name | Date |
|---|---|---|
| 373,691 | Schwahn | Nov. 22, 1887 |
| 395,974 | Hayes et al. | Jan. 8, 1889 |
| 1,161,750 | Strohmenger | Nov. 23, 1915 |
| 1,524,937 | Keeler | Feb. 3, 1925 |
| 1,941,040 | Mann | Dec. 26, 1933 |
| 2,278,248 | Darrah | Mar. 31, 1942 |
| 2,350,378 | Wallace | June 6, 1944 |
| 2,415,067 | Wallace | Jan. 28, 1947 |

FOREIGN PATENTS

| Number | Country | Date |
|---|---|---|
| 177,968 | Switzerland | Sept. 2, 1935 |

OTHER REFERENCES

"Journal of American Water Works Assn.," vol. 34 (1942), pages 1227 thru 1240.